United States Patent
Kim (10) Patent No.: US 11,191,386 B2
(45) Date of Patent: Dec. 7, 2021

(54) COFFEE MAKER

(71) Applicant: Hugh Kim Inc., Seoul (KR)

(72) Inventor: Hyun Soo Kim, Paju-si (KR)

(73) Assignee: HUGH KIM INC., Seoul (KR)

( * ) Notice: Subject to any disclaimer, the term of this patent is extended or adjusted under 35 U.S.C. 154(b) by 377 days.

(21) Appl. No.: 16/360,082

(22) Filed: Mar. 21, 2019

(65) Prior Publication Data

US 2020/0237135 A1 Jul. 30, 2020

(30) Foreign Application Priority Data

Jan. 24, 2019 (KR) .......................... 10-2019-0009129

(51) Int. Cl.
| | |
|---|---|
| *A47J 31/36* | (2006.01) |
| *A47J 31/44* | (2006.01) |
| *A47J 31/06* | (2006.01) |
| *A47J 31/38* | (2006.01) |

(52) U.S. Cl.
CPC ....... *A47J 31/4403* (2013.01); *A47J 31/0636* (2013.01); *A47J 31/38* (2013.01); *A47J 31/36* (2013.01)

(58) Field of Classification Search
CPC ............. A47J 31/38; A47J 31/36; A47J 31/24
See application file for complete search history.

(56) References Cited

U.S. PATENT DOCUMENTS

| | | | | |
|---|---|---|---|---|
| 8,733,233 | B2 * | 5/2014 | Samso Besora | A47J 31/36 99/302 P |
| 2005/0172818 | A1 * | 8/2005 | Hunt | A47J 31/38 99/279 |
| 2007/0227363 | A1 * | 10/2007 | Verna | A47J 31/54 99/279 |
| 2020/0060463 | A1 * | 2/2020 | Gardiner | A47J 31/38 |

FOREIGN PATENT DOCUMENTS

| | | |
|---|---|---|
| GB | 833927 A | 5/1960 |
| KR | 10-2018-0029045 A | 3/2018 |
| WO | 03/101264 A1 | 12/2003 |
| WO | 2013/032162 A2 | 3/2013 |
| WO | 2018/012682 A2 | 1/2018 |

\* cited by examiner

*Primary Examiner* — Reginald Alexander
(74) *Attorney, Agent, or Firm* — KORUS Patent, LLC; Seong Il Jeong (57) ABSTRACT

According to a coffee maker of the present invention, the multi-joint linkage of a drive mechanism is alternately arranged three-dimensionally in a front-back direction, and thus stronger pressing force may be applied and the pressing force may be uniformly transferred to both sides of the pressing portion. When a user simultaneously presses the drive mechanism with his or her both hands, the pressing force applied by the right drive mechanism and the pressing force applied by the left drive mechanism may be uniformly transferred to the pressing portion without loss, and thus the availability of the pressing force may be increased. The coffee maker according to the present invention is robust, has desirable durability, and may be aesthetically decorated with metal and transparent plastic materials.

5 Claims, 7 Drawing Sheets

COFFEE MAKER

CROSS-REFERENCE TO RELATED APPLICATION

This application claims the benefit of Korean Patent Application No. 10-2019-0009129 filed on Jan. 24, 2019, which is hereby incorporated by reference herein in its entirety.

BACKGROUND

1. Technical Field

The present invention relates to a coffee maker. In particular, the present invention relates to a coffee maker that is robust, is convenient to operate, and is capable of extracting a coffee liquid through efficient pressing. The present invention provides a portable lever-type espresso maker that has the same extraction performance but is easier to use and small due to its mechanical improvement.

2. Description of the Related Art

In the case of making, for example, espresso by using coffee beans, a method of placing coffee powder on a filter and pouring hot water into the coffee powder based on a coffee dripping method may be used as a method of extracting a coffee liquid. However, this method is disadvantageous in that the flavor of coffee is degraded because a coffee liquid is rapidly extracted with heated water. Since a paper filter is used, even the oil component of coffee is filtered out to thus degrade flavor, and extraction time is long.

Although the Dutch coffee extraction method is a method of extracting a coffee liquid for a long period of time by using room-temperature water or cold water, disadvantages arise in that the structure of a coffee maker is complex and waiting for a long period of time is required.

Furthermore, currently, lever-type espresso extraction machines have been commercialized. However, these machines are expensive, occupy large spaces, and are inconvenient to carry. Furthermore, these machines require long preheating periods, are inconvenient to clean, and cause concern that since each of the machines uses a single lever, force is concentrated on the front portion of the machine where the lever is pressed and thus the machine falls forward.

Korean Patent Application Publication No. 10-2018-0029045 relates to a piston-type espresso coffee machine for coffee, and discloses a so-called "hold-to-operate"-type machine including a cylinder, a piston, a rod having an end cooperating with the piston, an operating lever, and a piston moving member. However, this machine is disadvantageous in that it is difficult to design and install the piston and a spring that are pressed by the operating lever and the mechanical structures thereof are complex.

Therefore, there is a need for the provision of a coffee maker that can easily produce high pressure due to its difference in a lever mechanism, can be easily carried due to its small size, and can provide hot water by using an external electric heater without requiring the time required to heat water using a heating element and preheating time.

SUMMARY

The present invention has been conceived to overcome the above-described problems, and an object of the present invention is to provide a coffee maker, such as a portable lever espresso maker, that has the same extraction performance but is easier to use and small due to its mechanical improvement.

In order to accomplish the above object, the present invention provides a coffee maker, including: a base disposed on a transparent cylindrical housing; a drive mechanism disposed to partially pass through the base; and a movement unit coupled to the drive mechanism; wherein a lower portion of the movement unit forms a pressing portion, and a bottom of a housing is closed with a coffee extraction portion and thus a space is formed between the pressing portion and the coffee extraction portion; wherein the drive mechanism includes a pair of left and right drive mechanisms, each of the drive mechanisms includes a cam part configured such that a plurality of teeth is formed on a part of a circular arc and an operating lever formed to extend outward from a side of the cam part opposite to the teeth, a curved support strip protrudes from a body of the operating lever, and the drive mechanism and the movement unit are coupled to each other in such a manner that a plurality of links is connected from the support strip and an end of the links is connected to the movement unit; and wherein the left and right drive mechanisms are disposed with the teeth thereof engaged with each other, and the movement unit is moved between a first position reached in such a manner that when the left and right operating levers are pressed downward, forces are simultaneously received from the left and right drive mechanisms and the movement unit is moved to a lower portion of the housing and a second position reached in such a manner that when the left and right operating levers are pulled upward, forces are simultaneously received from the left and right drive mechanisms and the movement unit is moved to an upper portion of the housing.

The plurality of links may include: a first link configured to extend vertically downward from a first side of the support strip; a second link configured to extend horizontally from an end of the first link in a direction opposite to a direction of the first side; a third link configured to extend vertically downward from an end of the second link; and a fourth link configured to extend horizontally from an end of the third link in a direction identical to the direction of the first side.

The movement unit may include a support plate erected in a plate shape across a top surface of the pressing portion, and the drive mechanism and the movement unit may be structurally coupled to each other in such a manner that the fourth links are passed and fastened through openings formed in the left and right sides of the support plate.

The top surface of the pressing portion may be closed and the bottom of the pressing portion may be opened, a plurality of ribs may be formed such that the length thereof increases gradually from the center of the bottom of the top surface to a periphery of the bottom of the top surface, each of the ribs may include a center portion disposed close to the center of the pressing portion, a circumferential portion formed to have a large height to come into contact with the side wall of the pressing portion, and an intermediate portion configured to connect the center portion and the circumferential portion to each other, and the top of the space may have a relatively high center height and a relatively low peripheral height.

The base may include a front base and a rear base, each of the bases may include a center portion and side portions slightly curved outward from the center portion and disposed on both sides of the center portion, the side portions disposed on both sides of the center portion may be connected by a semicircular member extending outward, and the base may be coupled to the housing in such a manner that the semicircular member is fastened to the housing.

The strength of the movement unit may be increased by disposing one or more reinforcing flaps or ribs that connect the support plate and a top surface of the pressing portion with each other.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Some embodiments of the present invention will be described in detail below with reference to the exemplary drawings.

It should be noted that when reference symbols are assigned to elements shown in the accompanying drawings, the same symbols will be assigned to the same elements as much as possible even when the elements are shown in different drawings. Furthermore, in the following description of the present embodiment, when it is determined that a detailed description of a related well-known configuration or function may make the gist of the present embodiment obscure, the detailed description will be omitted.

Figure 2:
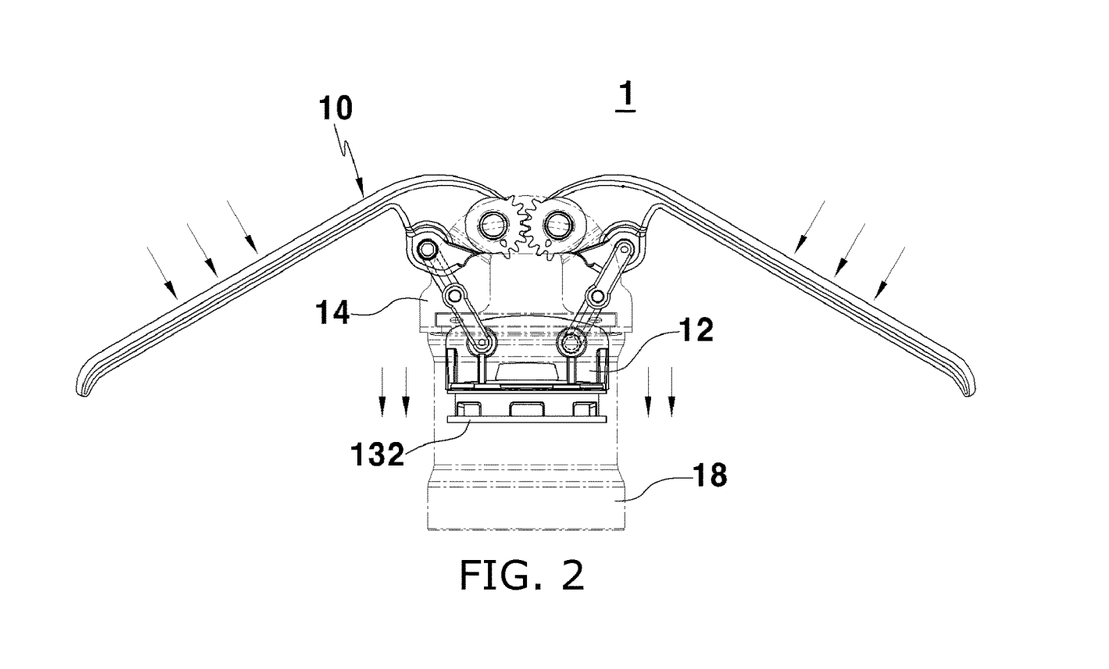
FIG. 2 is a front perspective view showing an intermediate state in which the drive mechanism of the coffee maker shown in FIG. 1 has been operated.
Figure 3:
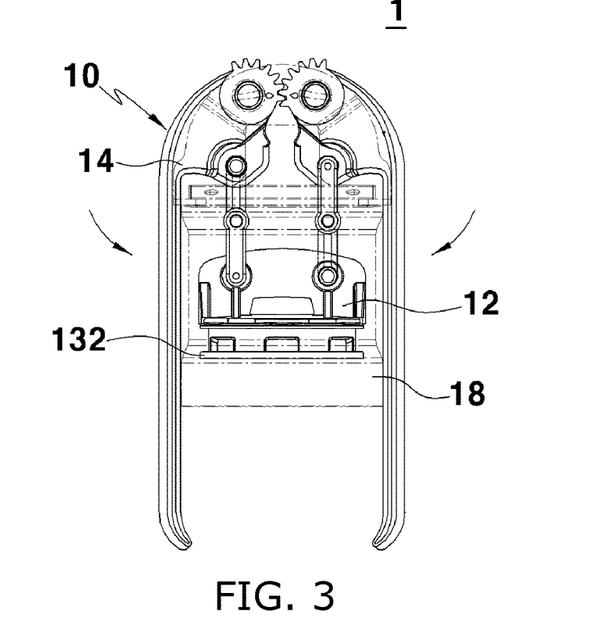
FIG. 3 is a front perspective view showing a final state in which the drive mechanism of the coffee maker shown in FIG. 2 has been pressed.

The overall structure of a coffee maker 1 according to an embodiment of the present invention will be described below with reference to FIGS. 1 to 3.

As shown in the drawings, the coffee maker 1 includes: a base 14 disposed on a transparent cylindrical housing; a drive mechanism 10 disposed to partially pass through the base 14; and a movement unit 12 coupled to the drive mechanism 10. The lower portion of the movement unit 12 forms a pressing portion 132, a space 16 is formed between the pressing portion 132 and a coffee extraction portion 18 by closing the bottom of a housing with by the coffee extraction portion 18, and coffee powder or grains are placed above the coffee extraction portion 18. High-temperature or room-temperature water is fed into the space 16 through the top surface of the housing.

The housing may be any receptacle or container that is capable of accommodating a coffee powder or coffee liquid.

Figure 1:
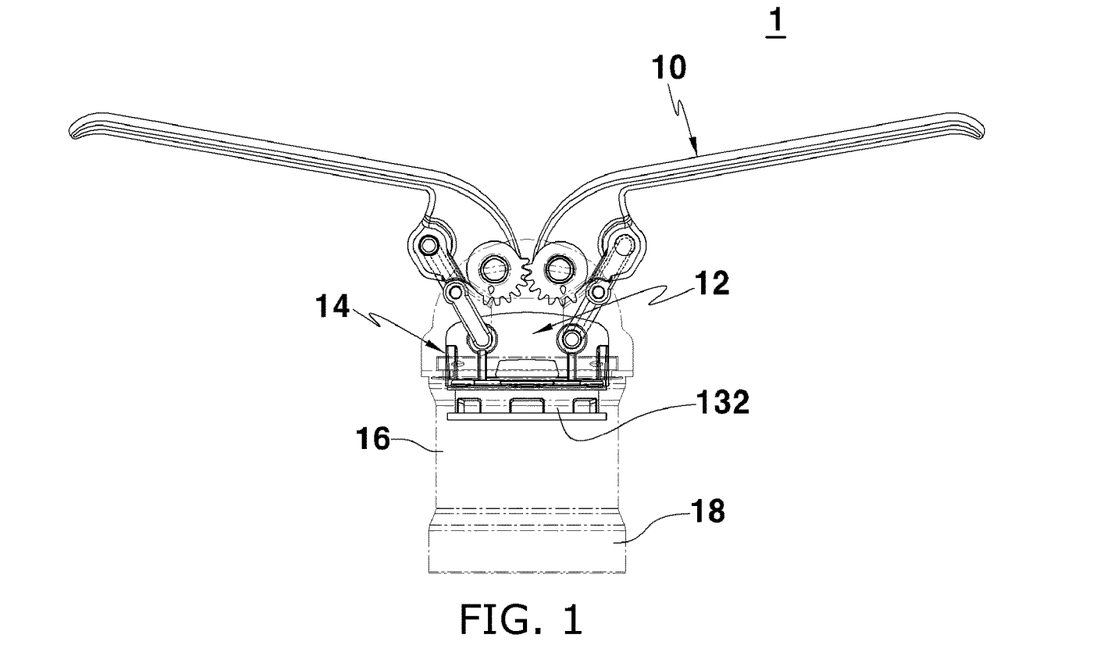
FIG. 1 is a front perspective view showing the initial operating state of a coffee maker according to an embodiment of the present invention.

FIG. 1 shows a standby state before the extraction of a raw coffee liquid. When a user presses and rotates the drive mechanism 10 with a hand, the movement unit 12 is gradually and rectilinearly moved vertically downward as a piston (see FIG. 2). Furthermore, when the user completely presses the drive mechanism 10, the pressing portion 132 comes close to the coffee extraction portion 18, and thus the extraction of a coffee liquid is completed (see FIG. 3). Water may be fed before the extraction. Alternatively, coffee powder may be pressed, water may be fed, and then a coffee liquid may be extracted. The extraction operation may be performed in two or more cycles.

Figure 4:
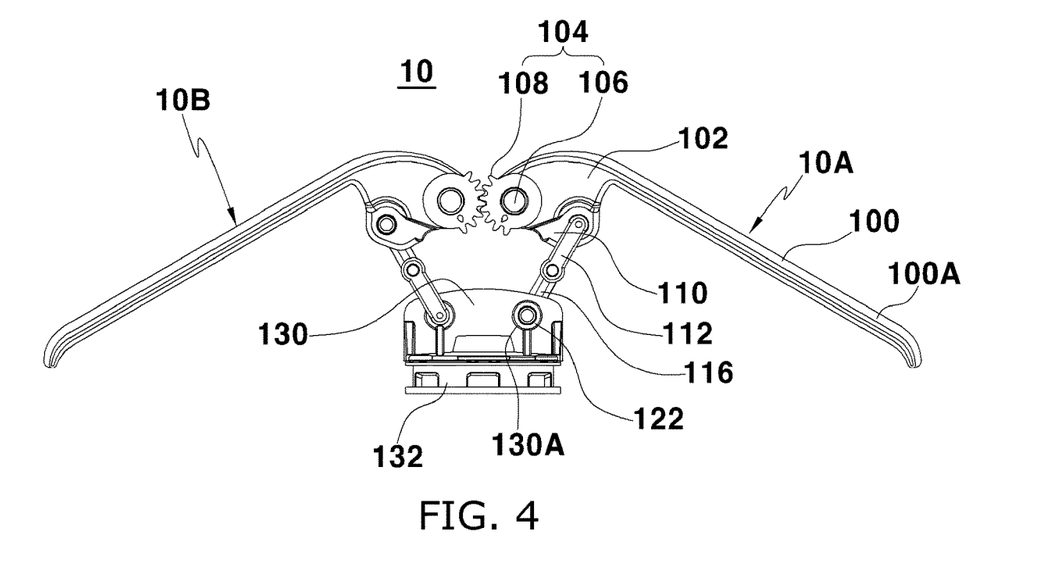
FIG. 4 is an assembled view showing only the drive mechanism and movement unit of the coffeemaker according to the present invention.

Next, the drive mechanism 10 according to the present invention will be described with reference to FIGS. 4 and 5. The drive mechanism includes a pair of left and right drive mechanisms 10A and 10B. Although the left and right drive mechanisms 10A and 10B have the same structure, there is a difference in that the front surface of the right drive mechanism 10A is disposed to be directed toward the front of the housing and the back surface of the left drive mechanism 10B is disposed to be directed toward the front of the housing. Although the following description will be given with a focus on the right drive mechanism 10A, the same description will be applied to the left drive mechanism 10B.

The drive mechanism 10A includes: a circular cam part 104 configured such that a plurality of teeth 108 is formed on a part of a circular arc and an opening 106 is provided at the center thereof; and an operating lever 100 formed to extend outward from the side of the cam part 104 opposite to the teeth 108. The operating lever 100 includes a thick body 102 formed to come close to the cam part 104, and a thin grip 100A formed to extend outward from the body 102. A curved support strip 110 protrudes from the other side of the body 102 of the operating lever 100. Furthermore, a first link 112, a second link 114, a third link 116, and a fourth link 122 are successively formed sequentially from the center portion of the support strip 110. As shown in FIG. 5, the first link 112 is vertically bent downward from the front of the support strip 110, and the second link 114 extends horizontally and backward from an end of the first link 112. The design is made such that an imaginary center line extending vertically from the support strip 110 is placed on the center portion of the second link 114, and thus the front-back stability of the link mechanism may be ensured and balance may be maintained. The third link 116 is vertically bent downward from an end of the second link 114, and the fourth link 122 extends horizontally and forward from an end of the third link 116. The fourth link 122 is formed to have a diameter larger than that of the third link 116 so that it can be inserted into the opening 130A of a support plate 130, as will be described later.

It is preferable that the drive mechanism 10 is fabricated by casting or injection molding with an alloy, such as SUS or aluminum.

Figure 6:
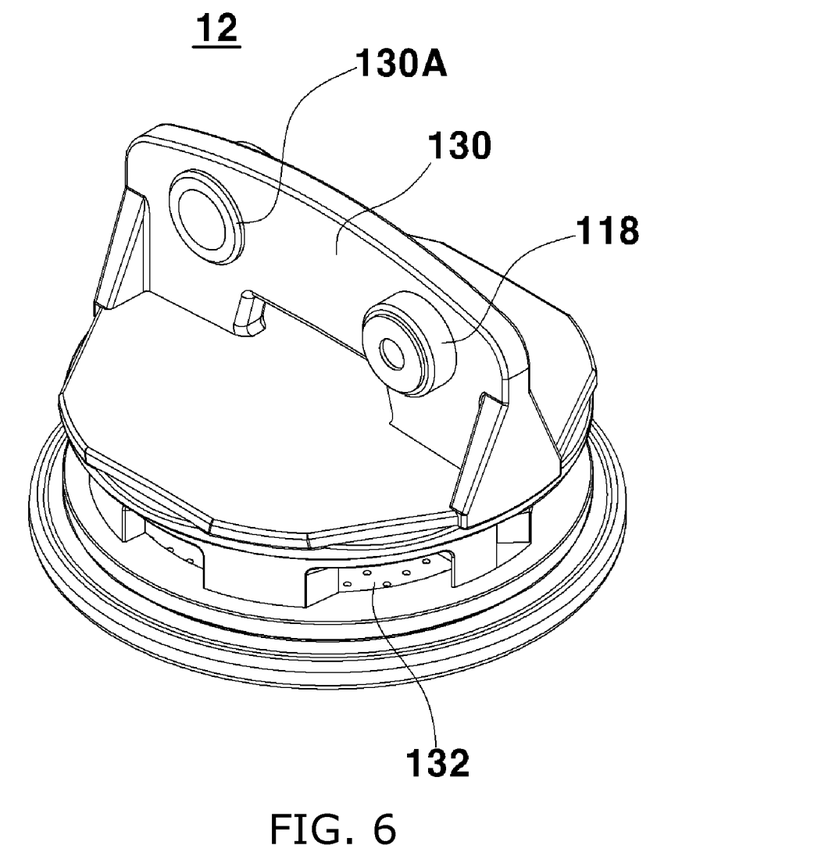
FIG. 6 is a perspective view showing the movement unit of the coffee maker according to the present invention when viewed from above.
Figure 7:
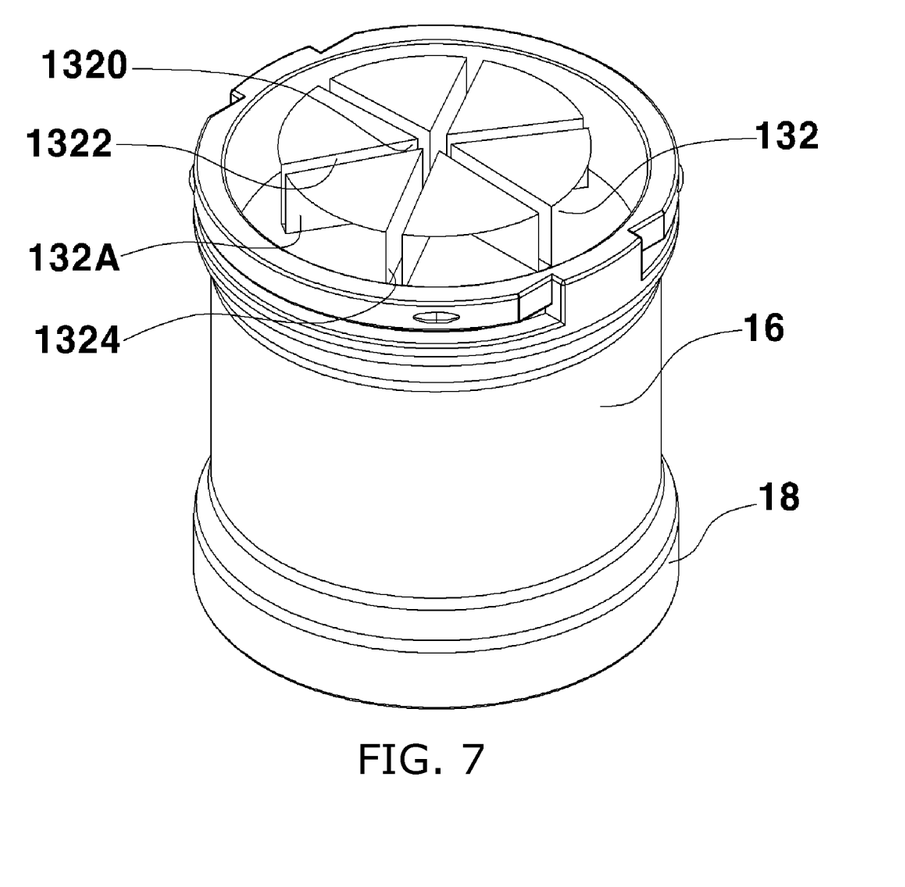
FIG. 7 is a conceptual diagram illustrating a space formed with respect to the movement unit shown in FIG. 6.

Next, the movement unit 12 according to the present invention will be described with reference to FIGS. 4, 6, and 7. The movement unit 12 includes the pressing portion 132 formed in a cylindrical shape and the support plate 130 erected in a plate shape across the top surface of the pressing portion 132, as shown in FIG. 6. It is preferable that the movement unit 12 is made of a transparent material harmless to a human body, such as glass or synthetic plastic.

The support plate 130 has a bridge shape attached to both sides of the top surface of the pressing portion 132, and an opening 130A is formed in the left and right center of the support plate 130. The drive mechanism 10 and the movement unit 12 are structurally connected to each other in such a manner that the fourth link 122 is passed through the opening 130A, as described above, and an end of the fourth link 122 is securely fastened by, for example, a hexagon nut 118.

The top surface of the pressing portion 132 is closed, but the bottom of the pressing portion 132 is open. 6 ribs 132A are formed such that the length thereof increases gradually from the center of the bottom of the top surface to the periphery of the bottom of the top surface. Each of the ribs 132A includes a center portion 1320 disposed close to the center of the pressing portion 132, a circumferential portion 1324 formed to have a large height and disposed to come into contact with the side wall of the pressing portion 132, and an intermediate portion 1322 configured to connect the center portion 1320 and the circumferential portion 1324 to each other, as shown in FIG. 7. As described above, the rib 132A is designed to have a curve the height of which increases gradually from the center to the periphery. Accordingly, the top of the space 16 has a relatively high center height and a relatively low peripheral height, and the space 16 enables the ribs 132A to press and grind coffee powder or the like while maximally accommodating coffee powder or coffee liquid while the pressing portion 132 is moving toward the coffee extraction portion 18.

Reference symbol 132B denotes open slots that are formed in the side wall of the pressing portion 132. The open slots 132B are formed between the ribs 132A, and function as paths for the entry of water or paths for the entry and exit of coffee liquid.

The above-described left and right drive mechanisms 10A and 10B according to the present invention are installed on the base 14 with their teeth 108 engaged with each other. When a user presses the grips 100A of the operating levers 100 downward, the first link 112, second link 114, third link 116, and fourth link 122 of each of the left and right drive mechanisms 10A and 10B are simultaneously moved downward and, at the same time, the support plate 130 and pressing portion 132 of the movement unit 12 are vertically moved downward. In contrast, when the user lifts the grips 100A of the operating levers 100 upward, the first link 112, second link 114, third link 116, and fourth link 122 of each of the left and right drive mechanisms 10A and 10B are simultaneously moved upward and, at the same time, the support plate 130 and pressing portion 132 of the movement unit 12 are vertically moved upward.

Figure 5:
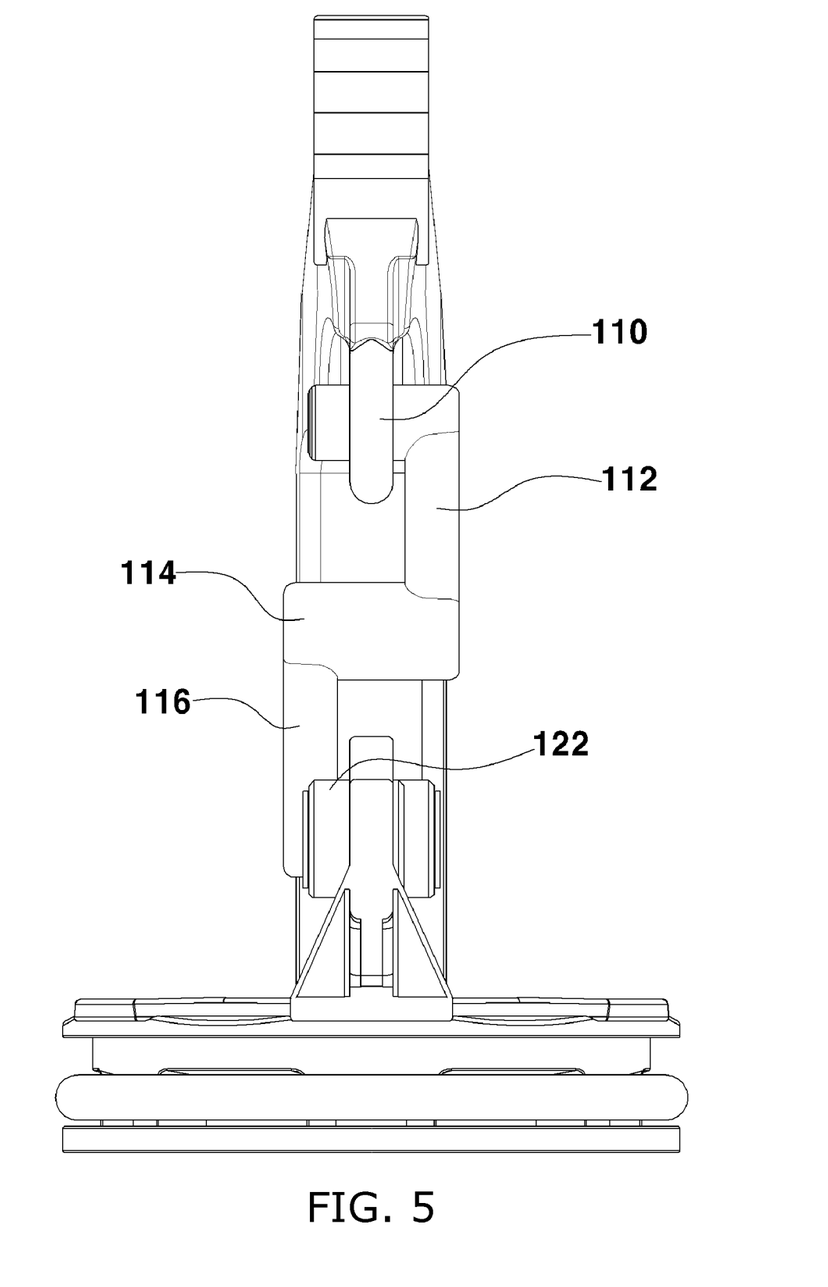
FIG. 5 is a side view showing the right drive mechanism shown in FIG. 4 when viewed from a side.

As shown in FIG. 5, the coffee maker 1 according to the present invention may apply stronger pressing force to the movement unit 12 than a case where a linkage is arranged in a single plane because the multi-joint linkage of the drive mechanism 10 is alternately arranged three-dimensionally in a front-back direction when viewed from a side. Furthermore, the pressing force is uniformly transferred to both sides of the pressing portion 132 through the plate-shaped support plate 130, and thus it may be possible to uniformly apply pressing force to coffee powder while using the support plate 130 as a plunger. In other words, the embodiment of the present invention is characterized by being configured such that when a user simultaneously presses the drive mechanism 10 with his or her both hands, the pressing force applied by the right drive mechanism 10A and the pressing force applied by the left drive mechanism 10B is uniformly transferred to the pressing portion 132 without loss.

Figure 8:
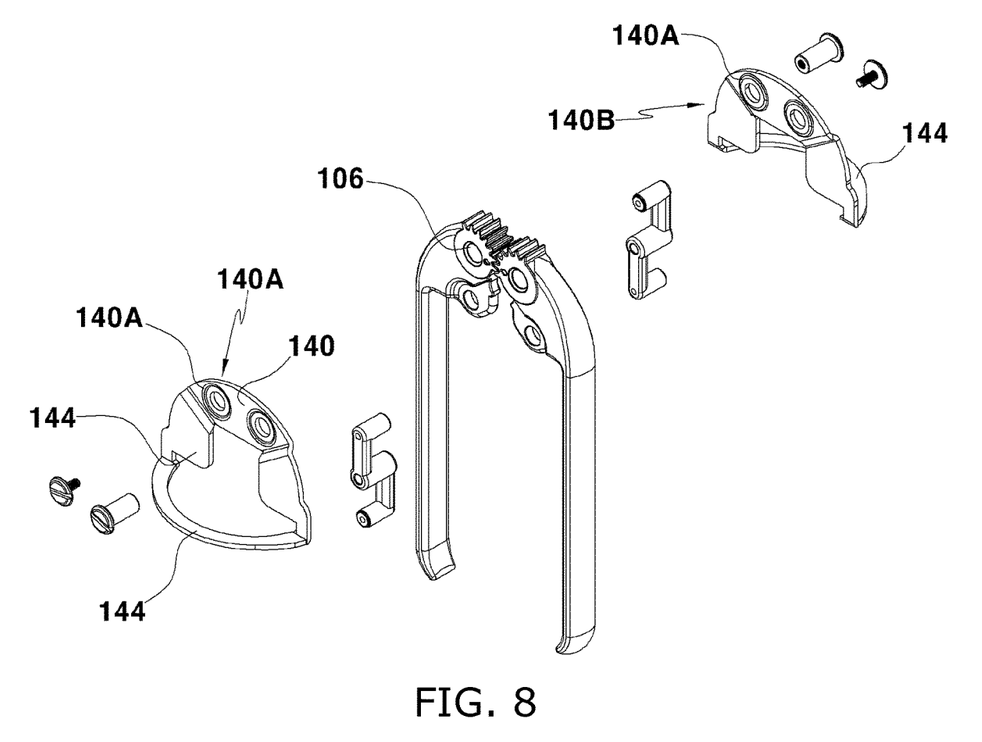
FIG. 8 is an exploded perspective view showing the base of the coffeemaker according to the present invention before assembly.

Next, the base 140 according to the present invention will be described with reference to FIG. 8. The base 140 includes a front base 140A and a rear base 140B. Since the front and rear bases 140A and 140B have the same structure, the following description will be given based on the front base 140A.

The front base 140A includes a center portion 140 and side portions 142 slightly curved outward from the center portion 140 and disposed on both sides of the center portion 140. Openings 1400A are formed in the center portion 140. The side portions 142 disposed on both sides of the center portion 140 are connected by a semicircular member 144 extending outward. The base 140 is coupled to the housing in such a manner that the semicircular member 144 of the front base 140A and the semicircular member 144 of the rear base 140B are fastened to the housing so that each of them occupies half of the circumference of the entry portion of the housing. In this case, a predetermined interval is formed between the front base 140A and the rear base 140B. Through this interval, the drive mechanism 10 is inserted such that the opening 106 of the cam part 104 of the drive mechanism 10 and the opening 1400A are aligned with each other, and then the openings 106 and 1400A are fastened by a bolt and a nut. In this way, the drive mechanism 10 is coupled to the base 140.

The operating principle of the above-described coffee maker 1 according to the present invention will be apparent from the above-described structure. In other words, when a user holds the operating levers 100 of the drive mechanism 10 with his or her both hands and rotates them downward, as shown in FIG. 2, the pressing portion 132 is linearly moved downward and presses the raw material of coffee against the top surface of the coffee extraction portion 18 like the plunger of a cylinder, as shown in FIG. 3. The force applied to press the two operating levers 100 is uniformly transferred to the movement unit 12, more specifically both sides of the movement unit 12 along the left and right paths of the support plate 130 and the pressing portion 132. The left and right teeth 108 are accurately engaged with each other so that they are rotated while meshing with the counterpart teeth, and thus the force applied to the left and right operating levers 100 is uniformly transferred to both sides of the movement unit 12. The length of the operating levers 100 are relatively long, and thus uniform and strong force may be applied to both sides of the movement unit 12 when the operating levers 100 are pressed with weak force, as in a lever or seesaw, so that a thick, flavorful raw coffee liquid can be extracted. Accordingly, the disadvantages of the conventional single lever pressing method may be overcome. Furthermore, the extraction of a coffee liquid may be completed by a single operation or a few operations, and thus the present invention is convenient and increases operating efficiency.

Although the embodiment of the present invention has been described above, this is intended merely for illustration. Accordingly, the sizes, shapes, locations, and numbers of the members do not limit the scope of the present invention, and may be varied in various manners.

Figure 9:
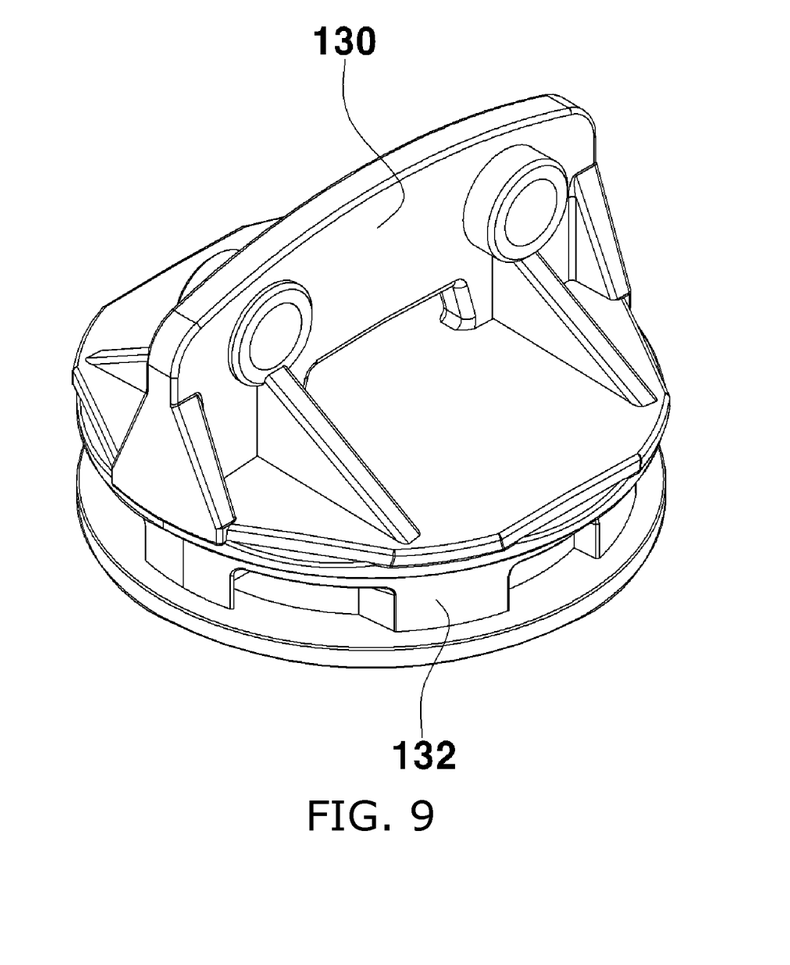
FIG. 9 is a perspective view showing a movement unit according to another embodiment of the present invention.

For example, as shown in FIG. 9, the strength of the movement unit 12 may be increased by installing triangular reinforcing flaps or ribs that connect the support plate 130 and the top surface of the pressing portion 132. By doing so, when strong pressing force is applied, pressure may be prevented from leaking due to the bending of the pressing portion 132, and the pressing portion 132 may be smoothly moved in a vertical direction in the state in which balance has been maintained.

According to the present invention, the multi-joint linkage of the drive mechanism of the coffee maker is alternately arranged three-dimensionally in a front-back direction, and thus stronger pressing force may be applied and the pressing force may be uniformly transferred to both sides of the pressing portion.

According to the present invention, when a user simultaneously presses the drive mechanism with his or her both hands, the pressing force applied by the right drive mechanism and the pressing force applied by the left drive mechanism may be uniformly transferred to the pressing portion without loss, and thus the availability of the pressing force may be increased.

The coffee maker according to the present invention is robust, has desirable durability, and may be aesthetically decorated with metal and transparent plastic materials.

All modifications also fall within the scope of the present invention, and the scope of the present invention is defined by the attached claims.

What is claimed is:

1. A coffee maker, comprising:
   a base disposed on a transparent cylindrical housing;
   a drive mechanism disposed to partially pass through the base; and
   a movement unit coupled to the drive mechanism;
   wherein a lower portion of the movement unit forms a pressing portion, and a bottom of the housing is closed with a coffee extraction portion and thus a space is formed between the pressing portion and the coffee extraction portion;
   wherein the drive mechanism comprises a pair of left and right drive mechanisms, each of the drive mechanisms comprises a cam part configured such that a plurality of teeth is formed on a part of a circular arc and an operating lever formed to extend outward from a side of the cam part opposite to the teeth, a curved support strip protrudes from a body of the operating lever, and the drive mechanism and the movement unit are coupled to each other in such a manner that a plurality of links is connected from the support strip and an end of the links is connected to the movement unit; and
   wherein the left and right drive mechanisms are disposed with the teeth thereof engaged with each other, and the movement unit is moved between a first position reached in such a manner that when the left and right operating levers are pressed downward, forces are simultaneously received from the left and right drive mechanisms and the movement unit is moved to a lower portion of the housing and a second position reached in such a manner that when the left and right operating levers are pulled upward, forces are simultaneously received from the left and right drive mechanisms and the movement unit is moved to an upper portion of the housing,
   wherein the plurality of links comprises:
   a first link configured to extend vertically downward from a first side of the support strip;
   a second link configured to extend horizontally from an end of the first link in a direction opposite to a direction of the first side;
   a third link configured to extend vertically downward from an end of the second link; and
   a fourth link configured to extend horizontally from an end of the third link in a direction identical to the direction of the first side.

2. The coffee maker of claim 1, wherein the movement unit comprises a support plate erected in a plate shape across a top surface of the pressing portion, and the drive mechanism and the movement unit are structurally coupled to each other in such a manner that the fourth links are passed and fastened through openings formed in left and right sides of the support plate.

3. The coffee maker of claim 2, wherein a top surface of the pressing portion is closed and a bottom of the pressing portion is open, a plurality of ribs is formed such that a length thereof increases gradually from a center of a bottom of the top surface to a periphery of the bottom of the top surface, each of the ribs comprises a center portion disposed close to a center of the pressing portion, a circumferential portion formed to have a large height to come into contact with a side wall of the pressing portion, and an intermediate portion configured to connect the center portion and the circumferential portion to each other, and a top of the space has a relatively high center height and a relatively low peripheral height.

4. The coffee maker of claim 3, wherein the base comprises a front base and a rear base, each of the bases comprises a center portion and side portions slightly curved outward from the center portion and disposed on both sides of the center portion, the side portions disposed on both sides of the center portion are connected by a semicircular member extending outward, and the base is coupled to the housing in such a manner that the semicircular member is fastened to the housing.

5. The coffee maker of claim 2, wherein strength of the movement unit is increased by disposing one or more reinforcing flaps or ribs that connect the support plate and a top surface of the pressing portion with each other.

* * * * *